United States Patent

[11] 3,590,834

| [72] | Inventor | Francis B. Henry<br>Tulsa, Okla. |
|---|---|---|
| [21] | Appl. No. | 765,084 |
| [22] | Filed | Oct. 4, 1968 |
| [45] | Patented | July 6, 1971 |
| [73] | Assignee | Williams Brothers Pipe Line Company<br>Tulsa, Okla. |

[54] CONTROL OF COMMINGLING BETWEEN IMMISCIBLE FLUIDS IN PIPELINE TRANSPORTATION
6 Claims, 2 Drawing Figs.

| [52] | U.S. Cl. | 137/1 |
|---|---|---|
| [51] | Int. Cl. | F17d 1/00 |
| [50] | Field of Search | 137/1, 13 |

[56] References Cited
UNITED STATES PATENTS
3,198,201  8/1965  Every ................ 137/1

*Primary Examiner*—Alan Cohan
*Attorney*—Richards, Harris and Hubbard

ABSTRACT: The commingling between two immiscible fluids in a pipeline is minimized by injecting an emulsion-producing detergent through the expected interfacial zone, the detergent being a material that is either soluble or highly dispersible in both fluids or highly dispersible in one and soluble in the other, an example being certain of the nonionic biodegradable alkyl phenol detergents with ester, alcohol and ether group side chains.

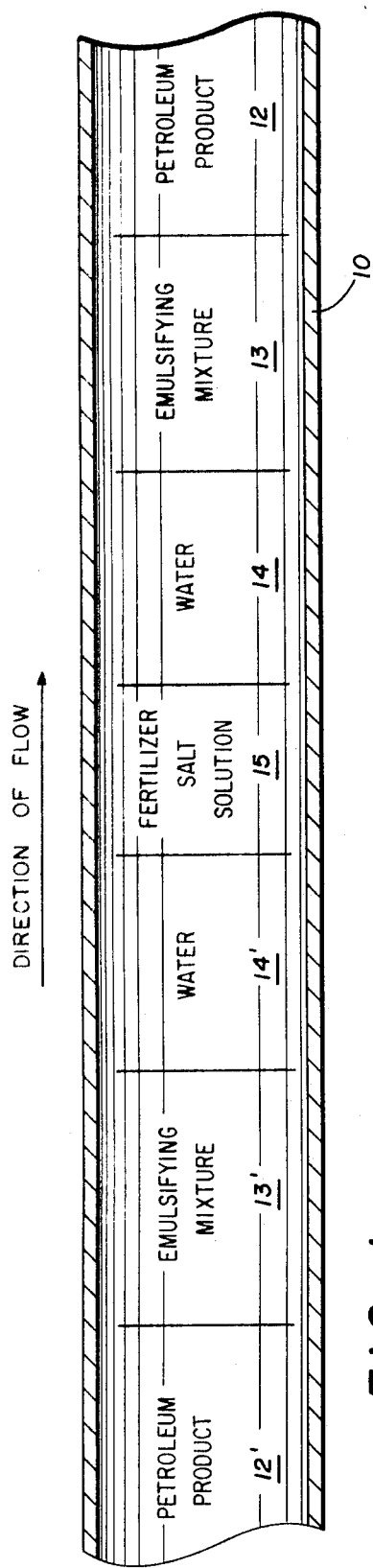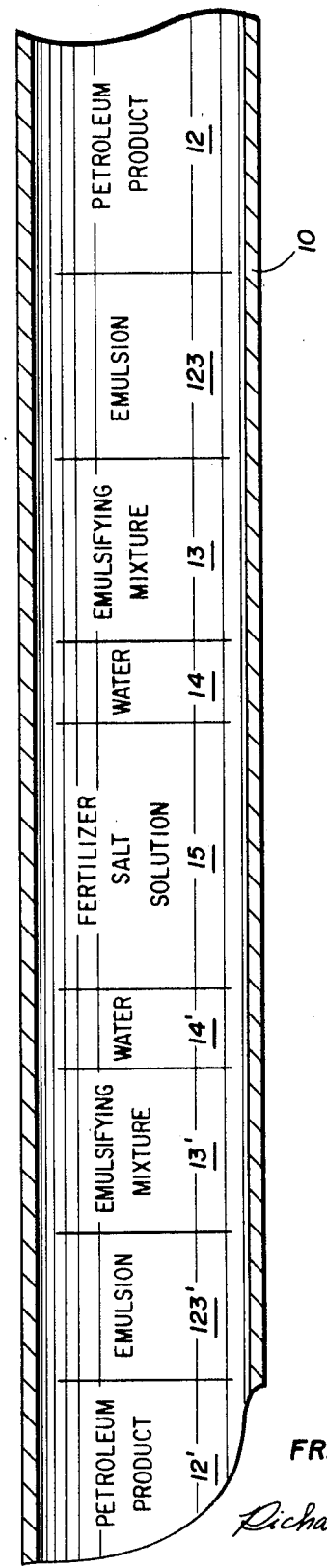

CONTROL OF COMMINGLING BETWEEN IMMISCIBLE FLUIDS IN PIPELINE TRANSPORTATION

This invention relates to a method for control of commingling between two immiscible fluids when they are pumped in sequence, one abutting the other, during pipeline transportation by injecting an emulsion-producing detergent through the expected interfacial zone between two immiscible abutting fluids to be moved in the pipeline.

When transporting by pipeline two immiscible fluids placed next to each other, one overrides or underrides the other and results in uncontrolled, extensive spread of one product into the movement of the other product. Attempts have been made to control this commingling between two immiscible fluids pumped in a pipeline next to each other to prevent the overriding or underriding of one product into another and controlling the dragging of leading product on pipe walls.

The movement of two immiscible fluids in a pipeline has heretofore involved pumping a solvent buffer material between them which has the property of being soluble in both of the two products which, in turn, are insoluble in each other. Satisfactory use of such miscible buffer normally requires a volume of buffer material equal to the maximum expected mixture which will be generated between two miscible fluids when pumped in sequence, one behind the other.

Control of the commingling is accomplished by the present invention through the addition of a small amount of additive material, less than one percent of the total interfacial mixture normally generated between miscible products when pumped next to each other in a pipeline. However, the invention also includes the technique of sequencing those fluids immiscible in each other but having the property of forming an equivalent or common emulsion zone upon contact of one with the other during turbulent flow in a pipeline without the use of additive.

Further in accordance with the invention, pipeline transportation of water solutions of fertilizer salts is achieved by use of the water fluid mentioned above as a buffer on both sides of a water-soluble fertilizer and the pumping of petroleum products sequenced in front of the water at the head end of the fertilizer solution and following the water on the back end of the fertilizer solution.

For a more complete understanding of the invention and for further objects and advantages thereof, reference may now be had to the following description taken in conjunction with the accompanying drawings in which:

FIG. 1 is a schematic illustration showing the flow of three different fluids in sequence through a pipeline, two of which are separated by an emulsifying mixture; and FIG. 2 is a schematic illustration showing the relative sizes and positions of the fluids of FIG. 1 and the resulting emulsions during and at the end of the pipeline transportation.

Referring now to the accompanying drawings in detail, FIG. 1 shows a pipeline 10 used in accordance with the invention for simultaneous transportation of two immiscible fluids. In the specific example given, one of such fluids is a petroleum product, while the other is water. The direction of flow in the pipeline is shown by the arrow at the top of FIG. 1.

In practicing the method of the invention, the petroleum product is first introduced into the pipeline as indicated at 12, and this is followed by the emulsifying mixture 13 which is a mixture of an emulsifying agent and water. The actual mixing of the emulsifying mixture can take place prior to its injection in the pipeline or the emulsifying agent can be injected into the desired amount of water as the water is being injected into the pipeline.

The fluid 14 which follows mixture 13, consists of water, which precedes and is soluble in and compatible with the liquid fertilizer solution 15, the latter being introduced into the pipeline after the water 14. It is to be noted that the emulsifying mixture 13 is highly dispersible in the petroleum product 12 and is soluble in the water 14.

If the transport of the fertilizer solution 15 is to be followed by another batch of petroleum product as indicated at 12' in FIG. 1, another batch of water 14' is introduced into the pipeline after the fertilizer 15 and another batch of emulsifying mixture 13' is introduced before the petroleum product 12'.

It will be understood that the continuity of flow as shown in the drawings may be extended ad infinitum and that the drawings are primarily intended to illustrate the general process or method. Therefore, for convenience, this invention will be particularly described with reference to the leading fluid phases 12, 13, 14 and 15, respectively.

By the time the end of pipeline transportation is reached as shown in FIG. 2, an emulsion zone has been formed at the interface of fluids 12 and 13. Thus, there will be an emulsion at the interface of the petroleum product 12 and the emulsifying mixture 13, as indicated at 123. At the interface of the water 14 and the fertilizer solution 15, some water will have gone into solution with the fertilizer solution thereby increasing the size of fluid 15 and decreasing its concentration. Similar results will occur at the interface of the water 14 and the emulsifying mixture 13. However, batches of emulsifying mixture and water will remain at 13 and 14, respectively, and, moreover, the two immiscible fluids, that is, the petroleum product 12 and the water 14, will remain separated by the emulsion 123 and the emulsifying mixture 13 and any undesirable contamination of either by the other will not occur.

The amounts of the emulsifying agent, water and resulting emulsifying mixture is predetermined in relation to the distance of transport and pipeline characteristics, so that batches of petroleum product and water maintain required purity by the time the end of the pipeline is reached.

Also, the concentration of the fertilizer solution 15 may be predetermined before transportation, so that after being diluted by some of the water in zone 14, the concentration is at the desired level when it reaches the end of the pipeline. The petroleum product 12 at the end of the pipeline is, of course, pure, and the emulsion zone 123 can be received into a gravity-settling tank and the petroleum product contained in the emulsion can be easily removed. The water and emulsifying mixture can be reused on subsequent occasions or can be disposed of since they are both inexpensive.

The foregoing is a generalized and somewhat simplified view and description of a pipeline operation. The present invention is directed to the minimization of the commingling between any two liquids in the line. In accordance with the present invention, a selected additive agent, for example, certain nonionic biodegradable alkyl phenol detergents with ester, alcohol and ether group side chains, is injected through the interface zones in both segments of water abutting a petroleum product. The emulsion zone produced between the two immiscible fluids prevents a state of commingling to such extent that the purity of both leading and following fluids is successfully maintained. The interface emulsion materials received in the gravity-settling tank are then easily separated by gravity. This permits economical return of the petroleum product to a salable stock container.

As above noted, the invention can facilitate the pipeline transportation of other materials with petroleum products, such as, for example, water solutions of fertilizer salts.

Since water is miscible in fertilizer-salt solutions, the fertilizer salts are prevented from spreading into an interface volume more than that of a normal mixture column produced by the pumping of two soluble products next to each other. As a consequence a water-fertilizer interface may be directed into the fertilizer-receiving tanks at the terminus end of the pipeline. The emulsifying mixture prevents undesirable contamination of the fertilizer with any materials other than the water pumped ahead of and behind it, and prevents undesirable contamination of the petroleum product with any other material.

An important characteristic of the emulsifying agent is that it allows the economical maintenance of product specifications. Emulsions produced with petroleum products are satisfactorily fluid and do not unduly congeal or coagulate.

The emulsion may be temporary and may be satisfactorily broken upon receipt at the terminus end of the pipeline. The emulsifying agent permits economical maintenance of specifications for products pumped in the pipeline when the properly selected agent comes in contact with these products. The emulsifying agent is highly dispersible in petroleum products and soluble or highly dispersible in other products to be pumped between such petroleum products. It has surface-active qualities which produce a temporary or easily-broken emulsion of selected petroleum products and water or such other materials as may be pumped when the pumping stream is in the required turbulent-flow conditions.

A satisfactory emulsifying agent for use with a No. 2 type petroleum fuel oil distillate is marketed by Pro-Finer Chemical Company of Tulsa, Oklahoma, under the name Profiner DL-108. This material is water soluble, highly oil dispersible, and surface active. It is a biodegradable detergent of the alkyl phenol type with ester, alcohol and ether group side chains. It normally is used in the de-salting of crude oil refinery feed stocks. In a more specific aspect, the material Profiner DL-108 is a water soluble, highly oil dispersible, surface active product having the following general physical properties:

Sp. Gr.    1.006
Pounds Per Gallon    8.38
Flash TOC    75° F.
Color    Dark Amber
Freezing Point    0° F.

Chemically, DL-108 is a complex oxyalkylated ester. An oxyalkylated resin of the paratertiary butyl phenol-formaldehyde type is partially esterified with a mixed fatty acid and then oxyalkylated with approximately an equal weight of ethylene oxide.

The approximate composition of DL-108 is as follows:

|  | Percent by volume |
|---|---|
| Active ester | 63.5 |
| Aromatic solvent | 11.2 |
| Isopropanol 99% | 17.6 |
| Water | 7.7 |
| Total | 100.0 |

In one operation, a pipeline loop consisted of 4,000 feet of 3 inch diameter pipe. In other operations, water was batched between petroleum product shipments on a 6 inch diameter 70-mile pipeline and on a 239 mile 8 inch diameter pipeline. The interfacial mixture volume control by use of the invention in the above operations is reasonably comparable to that experienced when pumping miscible products, one abutting the other in a pipeline.

Transportation of miscible products, such as gasoline abutting fuel oil is a normal practice in pipeline operation. Although not limited to such, the above operations revealed that the invention provides for economical pipeline movement of petroleum product followed by water which is not miscible in the petroleum product which is then followed by a water solution of agricultural fertilizer salts and water following the fertilizer, and then, in turn, petroleum product following the water.

The process-flow rate should be such as to provide turbulence to maintain axial and radial homogeneity of components in the emulsion zone. As presently determined, a minimum flow rate of 2.0 barrels per minute on 3 inch diameter pipeline provides sufficient turbulence for maintaining satisfactory emulsion stability in the pumping stream.

Experience has indicated that use of a pipeline-batching pig or a cup-and-brush scraper at each end of the emulsion zone ahead of and following the water buffer will assist in reducing spread of interfacial line mixture. Such devices may be required when pumping rate is below the minimum for maintaining satisfactory emulsion stability in the pumping stream as given above. Such devices frequently are used as an aid in the reduction of commingling between products when they are pumped next to each other in miscible systems. The use of such batching pigs between immiscible products during pipeline transportation can help to reduce the volume of mixture, but does not adequately prevent the overriding or underriding of one product in the other. Therefore, it is necessary to use either a buffer which is soluble in both products or the present invention, the latter being far more economical than the former.

While in the foregoing there has been described the primary use of the invention, it is noted that the additive agent may be injected in petroleum products moving through a pipeline to remove water collected in low spots of a petroleum-products pipeline. Alternatively, it may be used to separate, by water, two petroleum products and prevent generation of interfacial mixture composed of the two petroleum products.

Having described the invention in connection with certain specific embodiments thereof, it is to be understood that further modifications may now suggest themselves to those skilled in the art and it is intended to cover such modifications as fall within the scope of the appended claims.

What I claim is:

1. The method of controlling the spread of an interface between two immiscible liquids in a pipeline which comprises;
    controlling the flow of said liquids to place them with the ends abutting in said pipeline, and
    injecting upstream of said interface and through said interface an emulsion-producing detergent to thereby form an emulsion zone between said two immiscible liquids.

2. The method set forth in claim 1 wherein said detergent is an alkyl phenol type with ester alcohol and ether group side chains and where one of said liquids is water.

3. The method set forth in claim 2 in which said detergent is Profiner DL-108.

4. A method for control of the spread of an interface between first and second immiscible fluids passing through a pipeline one of which is water which comprises:
    introducing said first fluid into said pipeline;
    introducing an emulsifying fluid comprising an emulsion-producing detergent admixed with one of said fluids into said pipeline with the leading end thereof in juxtaposition to said first fluid; and
    introducing said second fluid into said pipeline with the leading end thereof in juxtaposition to said emulsifying fluid thereby forming an emulsion zone between said two fluids.

5. The method set forth in claim 4 wherein said detergent is an alkyl phenol type with ester alcohol and ether group side chains.

6. The method set forth in claim 5 in which said detergent is Profiner DL-108.